United States Patent
Wilson et al.

[11] 3,937,488
[45] Feb. 10, 1976

[54] VEHICLE SAFETY DEVICE

[75] Inventors: Kenneth R. A. Wilson, Salem, Oreg.; Lorenz A. Palm, Fort Erie, Canada

[73] Assignee: Irvin Industries Canada Limited, Fort Erie, Canada

[22] Filed: Feb. 22, 1974

[21] Appl. No.: 444,637

Related U.S. Application Data

[63] Continuation-in-part of Ser. No. 250,664, May 5, 1972.

[52] U.S. Cl. .................................. 280/150 AB
[51] Int. Cl.² ................................. B60R 21/08
[58] Field of Search .................... 280/150 AB

[56] References Cited
UNITED STATES PATENTS

| | | | |
|---|---|---|---|
| 3,799,574 | 3/1974 | Bonn et al. | 280/150 AB |
| 3,807,754 | 4/1974 | Rodenbach et al. | 280/150 AB |

Primary Examiner—Philip Goodman
Assistant Examiner—John P. Silverstrim
Attorney, Agent, or Firm—Browne, Beveridge, DeGrandi & Kline

[57] ABSTRACT

A vehicle safety device comprising an inflatable occupant restraint bag which is comprised of at least two different materials, one having a range of permeability to the inflating fluid of the restraint bag which is different from the range of inflating fluid permeability of the other, and wherein the overall inflating fluid permeability of the restraint bag is within a given design range.

6 Claims, 3 Drawing Figures

3,937,488

VEHICLE SAFETY DEVICE

BRIEF SUMMARY OF THE INVENTION

This invention is a continuation-in-part of the co-pending application of Kenneth R. A. Wilson, Ser. No. 250,664, filed May 5, 1972.

The invention generally relates to improvements in inflatable occupant restraint bags of the type disclosed in co-pending application Ser. No. 101,253, filed Dec. 24, 1970, entitled "Vehicle Safety Device", and co-pending application Ser. No. 217,308, filed Jan. 12, 1972, and entitled "Vehicle Safety Device."

The primary object of this invention is the provision of an inflatable occupant restraint bag which is comprised of at least two different materials having different ranges of permeability to the inflating fluid of the restraint bag, and wherein the overall inflating fluid permeability of the restraint bag is within a given desired range. In the preferred embodiment of the invention, at least one of the materials of which the restraint bag is made has a substantially low or relatively zero inflating fluid permeability and another has a variable inflating fluid permeability which may increase and decrease in relation to fluid pressures within the restraint bag.

A further object is the provision of a method for determining the desirable area of the restraint bag to be comprised of the materials of differing ranges of inflating fluid permeability in order to provide a restraint bag having an overall inflating fluid permeability which falls within a given range.

It is within the scope of the invention to make the restraint bag of a combination of two, three, or more materials having differing ranges of inflating fluid permeability and wherein one or more of such materials may have a low or relatively zero inflating fluid permeability and one or more of such materials may have a variable inflating fluid permeability.

The term "fabric" is frequently used to describe the material or materials of occupant restraint bags even though such material is not within the usually understood meaning of fabric. That is, such material may be referred to as a "fabric", even though it may be comprised of a plastic film. Accordingly, the term "fabric", as used herein, is intended to include all materials suitable for use in making inflatable occupant restraint bags according to the invention.

Stretch fabric is suitable for use as the material of variable permeability of the restraint bag and reference will be frequently made herein as to use of stretch fabric as the material of variable permeability.

Other objects and advantages of the invention will become apparent from the following detailed description, taken in connection with the accompanying drawings, and in which drawings:

DETAILED DESCRIPTION

Figure 1:
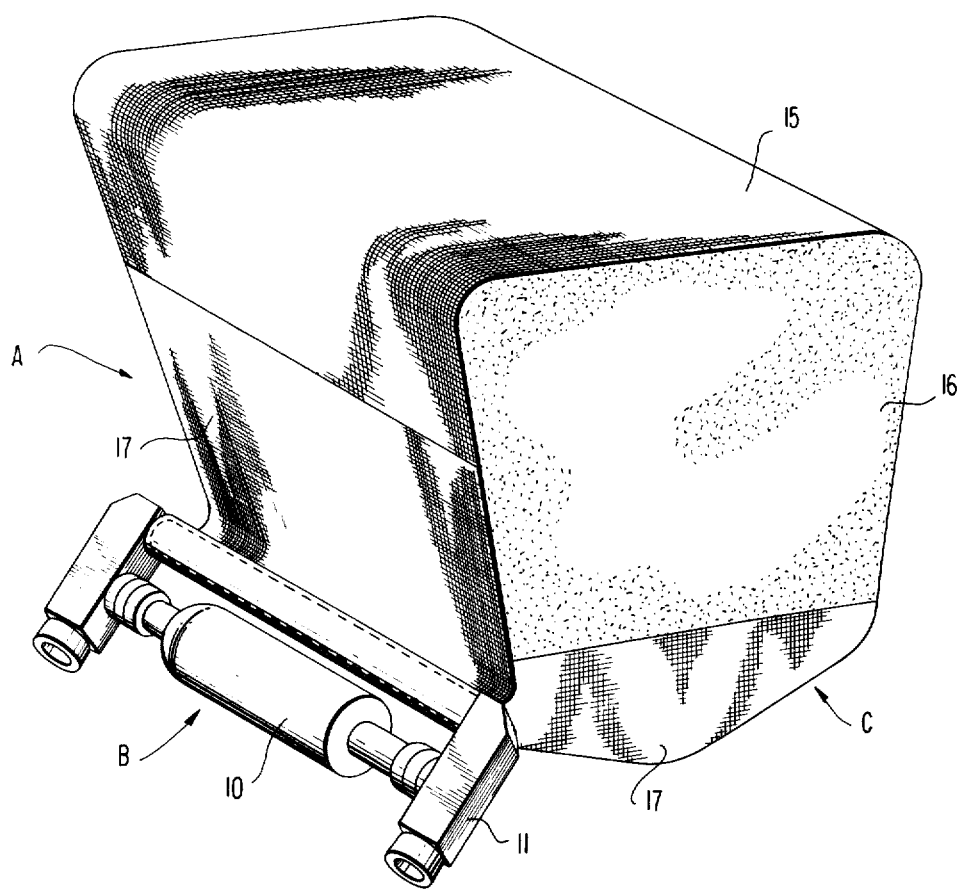
FIG. 1 is a perspective view of one type of vehicle safety device according to the present invention.

In the drawings, wherein for the purpose of illustration is shown a preferred embodiment of the invention, and wherein similar reference characters designate corresponding parts throughout the several views, the letter A may generally designate an inflatable occupant restraint bag including fluid supply means B and impact bag means C.

Inflatable occupant bag A may be suitably mounted on a vehicle frame, as is well known in the art. Since the inflatable occupant restraint bag will be mainly used in automobiles, it is obvious that the type of mounting will be dependent upon the location in which the same is to be mounted. For instance, it may be mounted on the dashboard in the case of the front seat passenger side, possibly in combination with the steering wheel on the driver's side, and in various other positions as is appropriate, considering the size and type of vehicle in which the same is to be mounted.

Fluid supply means B preferably includes a fluid source 10 and a diffuser 11, suitable sensor valve means (not shown) being provided. Such sensor valve means are well known in the art, and are operative on crash impact to permit fluid flow from fluid source 10 through diffuser 11 and into impact bag means C.

As previously described, impact bag means C may be made of a number of different types of fabrics or other materials, having differing ranges of permeability to the inflating fluid of the restraint bag. In the particular form shown in the drawings, impact bag means C is comprised in part of a base fabric or material 15 having a low or relatively zero inflating fluid permeability and, in part, of a material 16 having a variable inflating fluid permeability which increases and decreases in relation to the fluid pressures within the restraint bag, parts 17 thereof being reinforced for added strength. The portions 16 of variable permeability are preferably provided adjacent the sides of impact bag means C so that occupant impact thereagainst will not substantially impede fluid flow from the bag and through portions 16.

A woven stretch fabric in which the warp, weft, or both include stretch yarns may be used as the material of the occupant restraint bag having variable permeability with respect to the inflating fluid thereof. The denier used for the warp is not necessarily the same as the denier of the weft, and the specific denier used may be dependent upon the type and uses of the vehicle in which the same may be employed. The particular weave used may also be varied. If woven stretch fabric is used, it preferably has a virtually instantaneous recovery of at least 70% after elongation under normal operating conditions. A woven stretch fabric having a warp of high tenacity nylon and a weft of nylon-clad spandex fiber has been found to be suitable.

Figure 3:
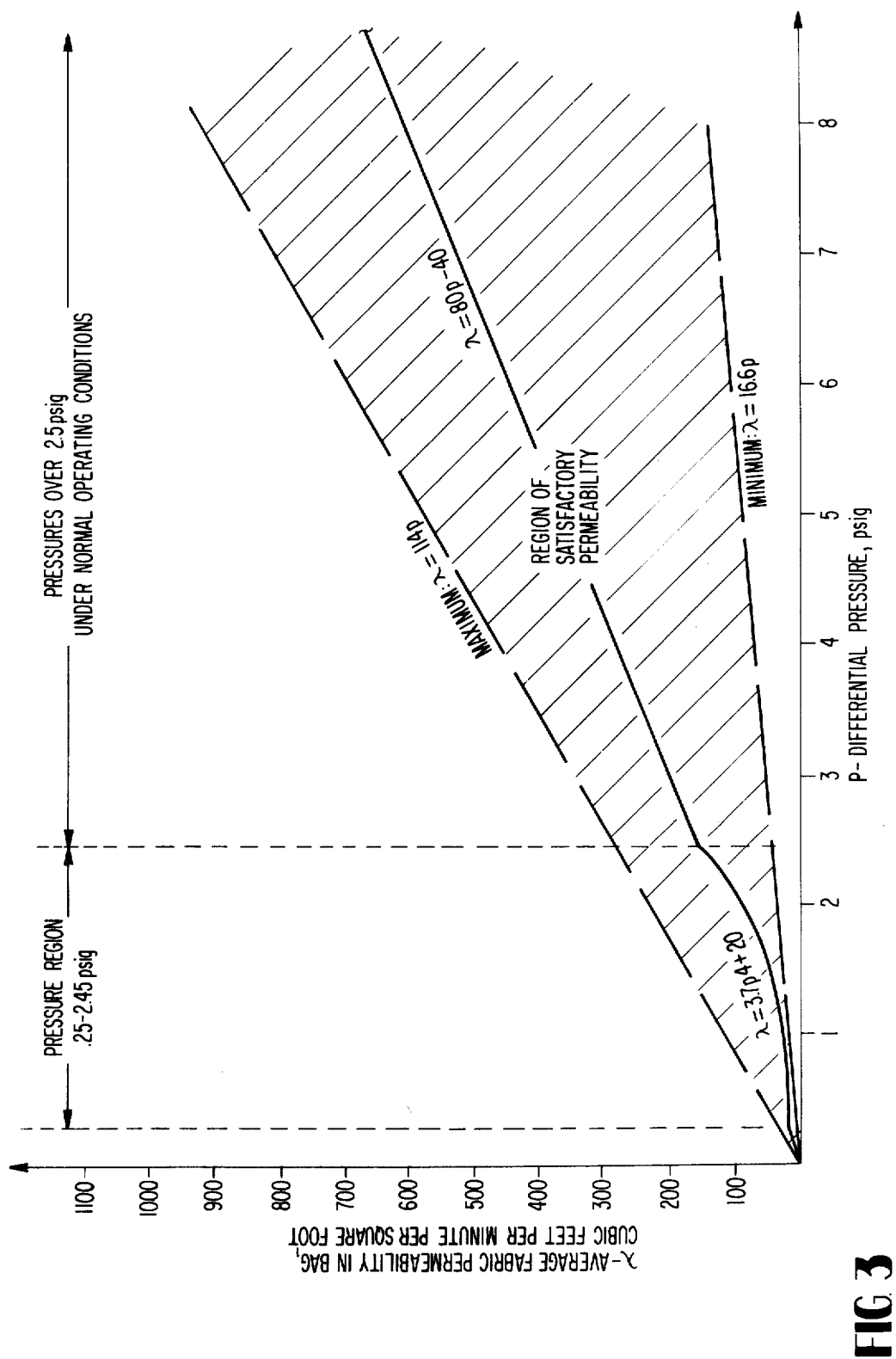
FIG. 3 is a graph showing a region of satisfactory overall permeability with respect to the total bag design area.

As shown in FIG. 3, the total or average permeability of the design area of the inflatable occupant restraint bag preferably has a flow profile, under impact conditions, at a vehicle velocity of substantially 30 miles per hour, and within the range of differential pressures to which such restraint bags will be normally subjected, which falls in a region of permeability/pressure plane bounded by the curves $\lambda = 114p$ and $\lambda = 16.6p$, wherein $\lambda$ is the average or total fabric permeability of the design area of the inflatable occupant restraint bag in terms of cubic feet of fluid flow per square foot per minute and $p$ is the differential pressure of fluid in the occupant restraint bag in terms of pounds per square inch gauge.

The base fabric portion of the bag may have a plastic coating applied thereto to make it almost totally impervious to fluid flow. Also, if desired, a fluid permeability plastic coating may be applied to the fabric of variable permeability in order to more closely regulate the permeability thereof.

In computation of average or total fabric permeability, the total design area of the bag is taken into account, including all reinforcement and doubler strips.

Figure 2:
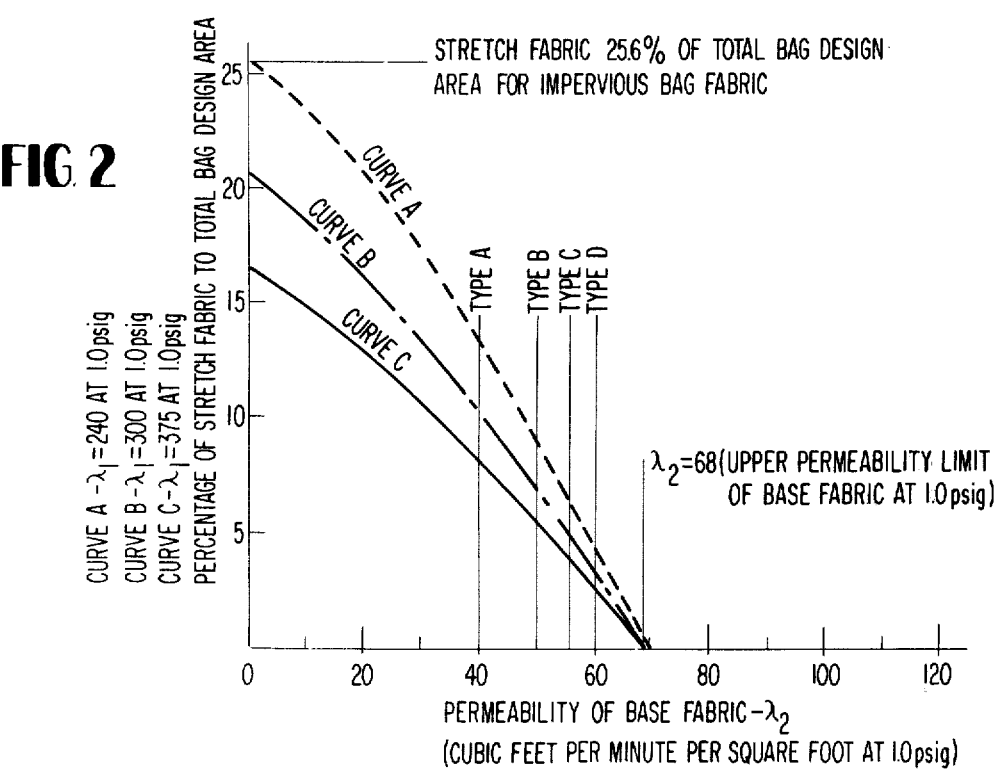
FIG. 2 is a graph showing the percentage of three different stretch fabrics, each of a given variable permeability, which may be used in relation to a base fabric of a given permeability to provide a restraint bag having a given overall permeability.

As shown in the graph of FIG. 2, permeability of the base fabric is preferably within the range of from zero to 67 cubic feet per minute per square foot at 1 p.s.i.g. and, considering use of a variable permeable fabric having a given permeability at 1 p.s.i.g., the percentage thereof to the total bag design area will vary according to both the permeability of the base fabric and the permeability of the variable permeable fabric thereof.

The permeability of the base fabric and of the fabric of variable permeability are, by necessity, a single number for each, at some selected arbitrary permeability that is written into the material or fabric specification. The reference pressure for permeability could obviously be selected from various available values of p.s.i.g. The value of 1 p.s.i.g. was selected as the reference pressure for the reason that the restraint bag at deployment and inflation has fully reached its designed shape, without any extensive stretch and distortion of irregular elements at edges and corners at this pressure. Also, most of the dumping of the high pressure inflating fluid has already occurred by the time that 1 p.s.i.g. appears in the bag, so the restraint bag is ready to accept occupant impact thereagainst.

Motor Vehicle Safety Standard 208, specified by the U.S. Government, sets forth certain particular performance requirements that must be met in providing an acceptable occupant restraint bag. By conducting various evaluations of restraint bags having components of variable permeability with respect to the inflating fluid thereof and plotting the maximum values of such evaluations against the total flow ($\epsilon\lambda_i S_i$) of a standard size passenger restraint bag it was determined that optimal selection of a ratio of the material of variable permeability to the other material of the restraint bag should be such as to provide a restraint bag having a total flow within the range of:

$$1800 < \epsilon\lambda_i S_i < 2300 \text{ cubic feet per minute.}$$

Test results show that the optimum total flow of the bag is substantially within the area of 2050 cubic feet per minute per square foot at 1 p.s.i.g.

In the above formula, $\epsilon\lambda_i S_i$ is the desired summation of flow through all pieces of material os which the bag is made ($\lambda S$ for each piece).

Assuming that a material of a given variable permeability is to be used in connection with a given base material, rather than a variety of materials of differing variable permeability, determination of the amount of the material of variable permeability to be used in relation to the total bag design area may generally be derived from:

$$\epsilon\lambda S = \lambda_1 S_1 + \lambda_2 S_2$$
$$S_1 + S_2 + S_3 = S_{Tot.} \rightarrow S_2 = S_{Tot.} - S_1 - S_3$$

wherein:

$\lambda_1$ is the permeability of the material of variable permeability.

$\lambda_2$ is the permeability of the base material of low or zero permeability.

$S_1$ is the design area of the material of variable permeability.

$S_2$ is the design area of the material of low or zero permeability.

$S_3$ is the area made relatively impervious by the installation of reinforcing.

$S_{Tot.}$ is the total bag design area.

$\lambda$ is in terms of cubic feet per minute per square foot at 1 p.s.i.g.

$S$ is in terms of square feet.

It thus follows that for a desired flow rate ($\epsilon\lambda_i S_i$) through the bag (which for the best effect should be within the range of $1800 < \epsilon\lambda_i S_i < 2300$ cubic feet per minute), the ratio of material of variable permeability to the other material of the restraint bag can be found thus:

$$\text{Area } S_1 = \frac{\Sigma\lambda_i S_i - \lambda_2(S_{Tot.} - S_3)}{\lambda_1 - \lambda_2}$$
(in square feet)

Since $\lambda_1$ and ($S_{Tot.} - S_3$) are known, the above expression permits determination of the required material area ratio, expressed as percentage of total bag area, as follows:

$$\%S_1 = \frac{100}{S_{Tot.}} \cdot \frac{\Sigma\lambda_i S_i - \lambda_2(S_{Tot.} - S_3)}{\lambda_1 - \lambda_2}$$

In this formula, as previously indicated, $\epsilon\lambda_i S_i$ is the desired summation of flow through all pieces of fabric of which the bag is made and $\lambda_1$ is the permeability of one material of variable permeability for which it is desired to establish an area in terms of a percentage of the total bag design area. In the event that several materials of variable peremability are used, $\lambda_1$ is the weighted average of such permeabilities. That is, assuming that two fabrics of variable permeability are to be used, one having a flow profile of 100 cubic feet per minute per square foot at 1 p.s.i.g. and the other having a flow profile of 200 cubic feet per minute per square foot at 1 p.s.i.g., an equal amount of each fabric being used, then the weighted average permeability would be 150 cubic feet per minute per square foot at 1 p.s.i.g. The weighted average of the fabrics of variable permeability may thus be readily computed, the permeability of each being known and the ratio of each to the other or others also being known.

As is obvious, when only a single material of variable permeability is used, then the weighted average of the material of variable permeability will be the same as the permeability of such material.

Likewise, when more than one material of variable permeability is used, $S_1$ will comprise the combined area of such materials.

In a like manner, when more than one base fabric of a low or relatively zero permeability is used, than $\lambda_2$ will be the weighted average of the permeability of the same, $S_2$ comprising the combined area of such base fabric.

As indicated by the graph of FIG. 2, when the base fabric is substantially impermeable to inflating fluid flow, then the percentage of stretch fabric with respect to the total bag design area preferably comprises slightly over 25% in connection with a stretch fabric having a permeability of 240 cubic feet per minute per square foot at 1 p.s.i.g.; slightly over 20% for a stretch fabric having a permeability of 300 cubic feet per minute per square foot at 1 p.s.i.g.; and slightly over 16% for a stretch fabric having a permeability of 375 cubic feet per minute per square foot at 1 p.s.i.g.

As an example of computation according to the above formula, we will assume the selection of a stretch fabric having a permeability of $\lambda_1 = 240$ cubic feet per minute per square foot at 1 p.s.i.g.; a base material having a permeability of $\lambda_2 = 60$ cubic feet per minute per square foot at 1 p.s.i.g.; that $S_{Tot.} = 33.12$ square feet; $S_3 = 3$ square feet; and wherein $\epsilon\lambda_i S_i$ is 2060 square feet per minute per square foot at 1 p.s.i.g. The percentage of stretch fabric that should be used in relation to the total bag design area can now be computed as follows:

$$\%S_1 = \frac{100}{33.12} \cdot \frac{2060 - 60(33.12 - 3)}{240 - 60}$$

$$= \frac{100(2060 - 1807)}{(33.12)(180)}$$

$$= 4.30$$

This gives the result that 4.3% of the total bag design area should be of a stretch fabric. For the given bag, this works out to be:

$$\frac{4.3}{100} \times 33.12 = 1.425 \text{ square feet.}$$

Of course, the above figures are merely illustrative of a manner of computation according to our formula and the invention is in no way to be deemed restricted to these particular figures.

Various changes may be made to the form of the invention herein shown and described without departing from the spirit of the invention or the scope of the following claims.

We claim:

1. A vehicle safety device adapted for attachment to a vehicle for protecting an occupant thereof during an accident, said vehicle safety device including impact bag means inflatable on crash impact by fluid flow thereinto, said impact bag means having a collapsed condition and an expanded operative condition for restraining movement of an occupant relative to the vehicle as the result of a crash impact, said impact bag means comprising in part a material from zero to low permeability with respect to the inflating fluid thereof and in part at least one other material having variable permeability which increases and decreases in relation to the fluid pressures within said impact bag means, certain areas of the bag being reinforced for added strength, and wherein the total flow rate of the inflating fluid through the material of the impact bag is within the range of $1800 < \epsilon\lambda_i S_i < 2300$ cubic feet per minute and wherein the area of the material of variable permeability is determined according to the formula:

$$\%S_1 = \frac{100}{S_{Tot.}} \cdot \frac{\Sigma\lambda_i S_i - \lambda_2(S_{Tot.} - S_3)}{\lambda_1 - \lambda_2}$$

wherein:

$\epsilon\lambda_i S_i$ is the desired summation of flow through all pieces of fabric ($\lambda S$ for each piece) and $\lambda_1$ is the weighted average of the permeability of the material of variable permeability, $\lambda_2$ is the weighted average of the permeability of the material of zero to low permeability, $S_1$ is the total of the design area of the material of variable permeability, $S_2$ is the total of the design area of material of zero to low permeability, $S_3$ is the area made relatively impervious by installation of reinforcing, $S_{Tot}$ is the total bag design area, all values of $\lambda$ are in terms of cubic feet per minute per square foot at 1 p.s.i.g, and all values of $S$ are in terms of square feet.

2. A vehicle safety device as specified in claim 1 wherein $\epsilon\lambda_i S_i$ is substantially 2050 cubic feet per minute at 1 p.s.i.g.

3. A vehicle safety device as specified in claim 1 wherein the upper limit of $\lambda_2$ is substantially sixty-seven cubic feet per minute per square foot at 1 p.s.i.g.

4. A vehicle safety device adapted for attachment to a vehicle for protecting an occupant thereof during an accident, said vehicle safety device including impact bag means inflatable on crash impact by fluid flow thereinto, said impact bag means having a collapsed condition and an expanded operative condition for restraining movement of an occupant relative to the vehicle as a result of a crash impact, said impact bag means comprising in part a materail from zero to low permeability with respect to the inflating fluid thereof and in part another material having variable permeability which increases and decreases in relation to the fluid pressures within said impact bag means, certain areas of the bag being reinforced for added strength, wherein the total flow rate of the inflating fluid through the material of the impact bag is within the range of $1800 < \epsilon\lambda_i S_i < 2300$ cubic feet per minute and wherein the area of the material of variable permeability is determined according to the formula:

$$\%S_1 = \frac{100}{S_{Tot.}} \cdot \frac{\Sigma\lambda_i S_i - \lambda_2(S_{Tot.} - S_3)}{\lambda_1 - \lambda_2}$$

wherein:

$\epsilon\lambda_i S_i$ is the desired summation of flow through all pieces of fabric ($\lambda S$ for each piece), $\lambda_1$ is the permeability of the material of variable permeability, $\lambda_2$ is the permeability of the material of from zero to low permeability, $S_1$ is the design area of the material of variable permeability, $S_2$ is the design area of the material of from zero to low permeability, $S_3$ is the area made relatively impervious by installation of reinforcing, $S_{Tot.}$ is the total bag design area, all values of $\lambda$ are in terms of cubic feet per minute per square foot at 1 p.s.i.g., and all values of $S$ are in terms of square feet.

5. A vehicle safety device as specified in claim 4 wherein $\epsilon\lambda_i S_i$ is substantially 2050 cubic feet per minute at 1 p.s.i.g.

6. A vehicle safety device as specified in claim 4 wherein the upper limit of $\lambda_2$ is substantially 76 cubic feet per minute per square foot at 1 p.s.i.g.

* * * * *